United States Patent
Bosco et al.

(10) Patent No.: US 9,607,020 B1
(45) Date of Patent: Mar. 28, 2017

(54) DATA MIGRATION SYSTEM

(71) Applicant: AMAZON TECHNOLOGIES, INC., Reno, NV (US)

(72) Inventors: Maria Selvam Don Bosco, Hyderabad (IN); Shobhit Goyal, Hyderabad (IN); Adnan Ahmed Lateefi, Hyderabad (IN); Vishal Prabhakar, Jalandhar (IN)

(73) Assignee: Amazon Technologies, Inc., Reno, NV (US)

( * ) Notice: Subject to any disclaimer, the term of this patent is extended or adjusted under 35 U.S.C. 154(b) by 414 days.

(21) Appl. No.: 14/029,233

(22) Filed: Sep. 17, 2013

(51) Int. Cl.
 *G06F 17/30* (2006.01)

(52) U.S. Cl.
 CPC ................. *G06F 17/303* (2013.01)

(58) Field of Classification Search
 CPC .. G06F 17/303; G06F 17/30; G06F 17/30607; G06F 17/30592; G06F 17/30575
 USPC .. 707/610, E17.005, 620, 802, 803, 999.203
 See application file for complete search history.

(56) References Cited

U.S. PATENT DOCUMENTS

| 7,099,875 | B2* | 8/2006 | Kedem | G06F 3/0613 707/610 |
| 8,234,246 | B1* | 7/2012 | Jorapurkar | G06F 11/1471 707/633 |
| 2007/0011209 | A1* | 1/2007 | Wietlisbach | G06F 9/44505 |
| 2013/0073519 | A1* | 3/2013 | Lewis | G06F 17/30215 707/610 |
| 2013/0124467 | A1* | 5/2013 | Naidu | G06F 17/30575 707/610 |

\* cited by examiner

*Primary Examiner* — Robert Beausoliel, Jr.
*Assistant Examiner* — Pedro J Santos
(74) *Attorney, Agent, or Firm* — Lindauer Law, PLLC

(57) ABSTRACT

Described are techniques and systems to migrate data from a first data structure to a second data structure stored in datastores which are replicated with one another. A "hot" datastore is replicated with one or more "warm" datastores. Triggers maintain consistency between the first data structure and the second data structure. Migration may involve testing using the second data structure of the "warm" datastore. Data processed by the first data structure on the "hot" datastore is distributed via replication to the "warm" datastore, and then by a trigger to the second data structure. Data processed by the second data structure on the "warm" datastore is distributed via trigger to the first data structure, and then by replication to the "hot" datastore. Once performance of the second data structure is deemed acceptable, the "warm" datastore may be designated as "hot" and synonyms therein may direct data to the second data structure.

20 Claims, 8 Drawing Sheets

DATA MIGRATION SYSTEM

BACKGROUND

Many entities operate datastores used in high reliability situations. Medical organizations maintain patient records, online retailers maintain information about products for sale, and so forth.

Over time, new datastores may be added, schema changes may be contemplated, or other changes to the datastores may be called for. Migration of data from one data structure to another or schema changes in production datastores is fraught with risk. Migration errors may result in failure of mission critical systems. This may result in loss or corruption of mission critical data, loss of service, and so forth.

Figure 1:
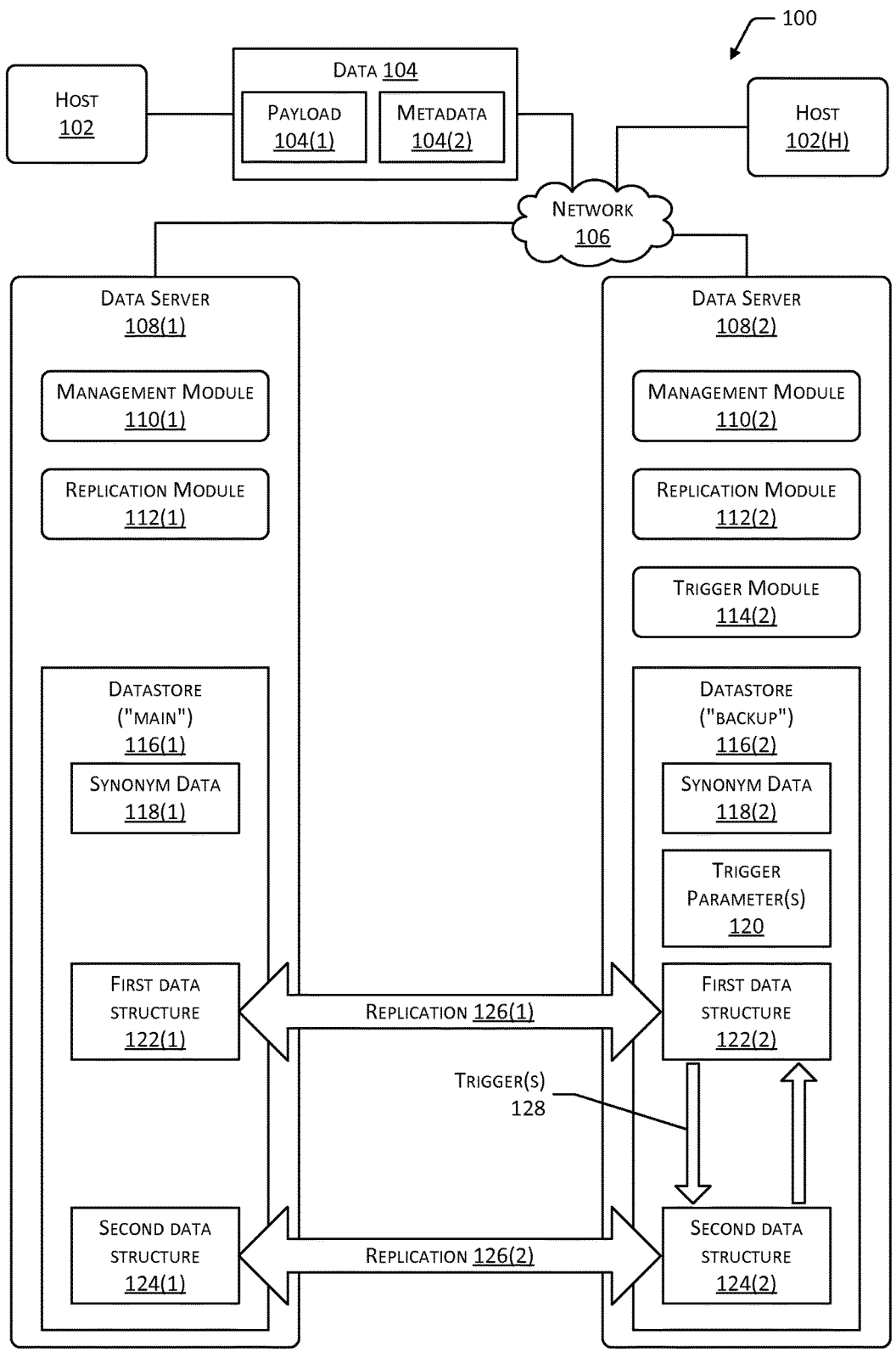
FIG. 1 is a system configured to migrate data from a first data structure to a second data structure using replication between main and backup datastores, synonyms, and triggers executed based on one or more trigger parameters.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Many entities use datastores to store and manipulate data. These datastores may include relational databases, object-oriented databases, distributed data stores, flat files, non-relational databases, and so forth.

The entities using these datastores may seek to maintain a high level of reliability to services accessing these datastores. For example, a particular datastore may be mission critical in that a failure would severely impact or cause cessation of core functions of that entity. As a result, these entities seek to minimize or eliminate these risks. However, several operations performed by datastore administrators have traditionally increased the risk of failure in the datastore. These operations may include data migration, schema changes, and so forth.

Described in this disclosure are systems and techniques for performing data migration, schema changes, and so forth while reducing or eliminating risk of failure. A first datastore having a first data structure and a second data structure is configured to replicate data with a second datastore having a replicated version of the first data structure and a second data structure. The replication may be provided at a data storage layer by a storage layer service. A replication group designates two or more datastores, across which one or more data structures are replicated. Within a single datastore, multiple replication groups may exist contemporaneously. For example, the first data structure may be within a first replication group while the second data structure may be within a second replication group. As a result of the replication, changes to the data structure in one datastore are also effective at the corresponding replicated data structures in other datastores which participate in the replication group. Continuing the example, the first data structure may be an existing table storing data for migration, while the second data structure is the new table for use post-migration.

A replicated datastore may be designated as a "main" or "hot" datastore or a "backup" or "warm" datastore. The main datastore is configured to be responsive to requests from one or more hosts for performing one or more operations on data in the data structures. During traditional operation, the backup datastore is held in reserve and placed into operation upon failure or deactivation of the main datastore. Both the main and the backup datastore are thus able to be responsive to requests.

Within a given datastore, one or more synonyms are configured to direct processing of data with regard to the data structures in the datastore. For example, a synonym may be an alternative name for a table, view, query, and so forth. The data to be processed may include a payload and metadata. The payload may include information to be added to one or more data structures, operations to be performed, and so forth. The metadata may include information such as identification of a program module on a host which generated the data.

Once replication has been established between the first (or "main") datastore and the second (or "backup") datastore, one or more triggers may be configured on the second datastore. The triggers are configured to propagate changes between the first data structure and the second data structure as stored in the second datastore. For example, a change to the second data structure would result in a trigger which makes a corresponding change in the first data structure. Because of the replication established between the first and second datastores, the changes to the first data structure and the second data structure are provided to the corresponding data structures in the first datastore. Similarly, a change to the first data structure in the first datastore is replicated to the first data structure in the second datastore, and from there a trigger makes a corresponding change in the second data structure. By using the replication and triggers, changes to one data structure flow through to the other data structures. The triggers are configured to prevent infinite loops or runaway operations. In one implementation, the trigger may use one or more trigger parameters to analyze metadata. For example, the trigger parameters may specify a module name authorized to activate the trigger. When the metadata matches the trigger parameters, such as for a particular module providing the data in a datastore session, the trigger may be activated. After use, the metadata may be modified such that the triggers will not be activated a second time.

Additionally, synonym data for the datastores is configured to direct processing of the data to a particular data structure. The first datastore may have first synonym data configured to direct data to the first data structure. The second datastore may have second synonym data configured to direct data to the second data structure. During the migration process the first datastore may continue to operate as the "main", handling the bulk of the processing of incoming data. However, a selected group of one or more hosts may be configured to use the second datastore instead of the first datastore. The second datastore receives the data, and based on the second synonym data, processes the data using the second data structure. Once the operation of the second data structure is determined to be satisfactory, the remaining hosts may be directed to use the second datastore as "main", while the first datastore is deprecated to "backup" status. The first synonym data may be updated such that data received at the first datastore is directed to the second data structure. The triggers may be deactivated, and the system proceeds to use the second data structure, which may continue to be replicated across the second replication group.

The techniques and systems described in this disclosure enable incremental testing and migration. As a result, a particular host may be used to test the migrated data or changed schema before deployment to all hosts. The process of testing with a relatively small number of hosts, known as "one-box testing", thus becomes possible. Hosts may be transitioned between the first data structure and the second data structure at any time, with data consistency maintained between the first data structure and the second data structure. The data structures may reside within different replication groups. As a result, these techniques may be used to migrate data from one replication group to another.

Illustrative System

FIG. 1 is a system 100 configured to facilitate migration of data, schema updates, and so forth using replication, synonyms, and one or more triggers. One or more hosts 102(1), 102(2), . . . , 102(H) are depicted. As used in this disclosure, letters in parenthesis such as "(H)" indicate a nonzero integer value. The hosts 102 may include, but are not limited to, dedicated devices, end-user devices, services executing on one or more devices, distributed compute services, and so forth. The hosts 102 produce data 104. The data 104 may include payload 104(1) and metadata 104(2). The payload 104(1) may include one or more of information to be stored, instructions to retrieve information, instructions to modify information, and so on. The metadata 104(2) comprises information associated with the data 104(1), including but not limited to generation, delivery, processing, credentials, and so forth. In one implementation, the metadata 104(2) may include a module name of a module executing on the host 102 which has initiated a datastore session to a datastore.

The hosts 102 communicatively couple to one or more networks 106. The network 106 may include one or more public or private networks, such as the Internet, private wide area network, and so forth. Data servers 108(1), 108(2), . . . , 108(N) are also communicatively coupled to the one or more networks 106, and may exchange information with the hosts 102. As illustrated here, the hosts 102 may send data 104 to the data servers 108 for processing. The data servers 108 may be located in one or more physical locations. Furthermore, the data servers 108 may comprise one or more pieces of computing hardware. For example, the data server 108(1) may comprise a distributed computing system spread across multiple servers in more than one geographic location.

The data servers 108 are configured to process the data 104. The data server 108 may comprise a management module 110, a replication module 112, a trigger module 114, and a datastore 116. The management module 110 is configured to manage the processing operations of the data server 108. For example, the management module 110 may comprise a database management system.

The datastore 116 is configured to contain information such as the data 104 for manipulation. For example, the datastore 116 may comprise a database container. The datastore 116 may include synonym data 118, trigger parameters 120, a first data structure 122, a second data structure 124, and other information.

Replication 126(1) between the first data structure 122(1) of the first datastore 116(1) and the first data structure 122(2) of the second datastore 116(2) is illustrated. Similarly, replication 126(2) between the second data structure 124(1) of the first datastore 116(1) and the second data structure 124(2) of the second datastore 116(2) is established. Replication groups may be designated in which particular data structures are replicated across two or more datastores 116. The replication groups are discussed in more detail below with regard to FIG. 4.

The replication module 112 is configured to support the replication 126 between data servers 108, datastores 116, or both. The replication module 112 may operate on a data storage layer. For example, the replication module 112 may work in conjunction with an operating system module (see FIG. 6 below) to transfer blocks of information between data structures participating in replication. For example, the management module 110 may support infrastructure promulgated by Oracle Corp. of Redwood City, Calif. and the replication module 112 may implement the multi-master replication ("MMR") for use with Oracle® databases.

The synonym data 118 stores one or more synonyms. Synonyms direct processing of the data 104. In some implementations, the synonyms may comprise pointers to the data structures in the datastore 116. For example, a synonym may be an alternative name for a table, view, query, and so forth. During the migration process, the first synonym data 118(1) of the first datastore 116(1) may be configured to direct the data 104 received at that datastore to the first data structure 122(1). Also during the migration process, the second synonym data 118(2) of the second datastore 116(2) may be configured to direct the data 104 received at that datastore to the second data structure 124(2). Functionality of the synonyms in the system 100 is described in more detail below with regard to FIG. 3.

The trigger module 114 is configured to activate one or more triggers 128. A particular trigger 128 may be associated with one or more data structures. Activation of the trigger(s) 128 may be based on a comparison or analysis of at least a portion of the data 104 with the one or more trigger parameters 120. The trigger parameters 120 specify one or more conditions for activation of the trigger(s) 128 to occur. For example, the trigger parameters 120 may designate a datastore session associated with a particular module. Continuing the example, the session from the particular module would activate the trigger 128, while a session from another module not indicated by the trigger parameters 120 would not. By configuring the trigger parameters 120, the system can avoid processing the data 104 more than once which may result in duplication or corruption of information in the data structures. As shown in this illustration, the first data server 108(1) omits the trigger module 114, the trigger parameters 120, and thus does not implement the one or more triggers 128. However, in other implementations the data server 108(1) or other data servers 108 may include the trigger module 114, the trigger parameters 120, and the one or more triggers 128. The trigger parameters 120 are discussed in more detail below with regard to FIG. 2.

The first data structure 122 may comprise a table, key-value pairs, linked list, flat file, collection of objects, executable code, script, and so forth. The second data structure 124 may comprise may comprise a table, key-value pairs, linked list, flat file, collection of objects, executable code, script, and so forth. The first data structure 122 and the second data structure 124 may, but need not, have similar structures. In one example, the first data structure 122 and the second data structure 124 may comprise relational tables. In another example, the first data structure 122 may comprise a relational database while the second data structure 124 may comprise an object-oriented database. Two data structures 122 and 124 are depicted by way of illustration, and not necessarily as a limitation. The datastore 116 may contain more than two data structures.

Because of the replication 126 and the triggers 128, changes to the first data structure 122, the second data structure 124, whether at the main datastore 116(1) or the backup datastore 116(2) are propagated throughout the system. This is discussed in more detail below with regard to FIG. 4.

Figure 2:
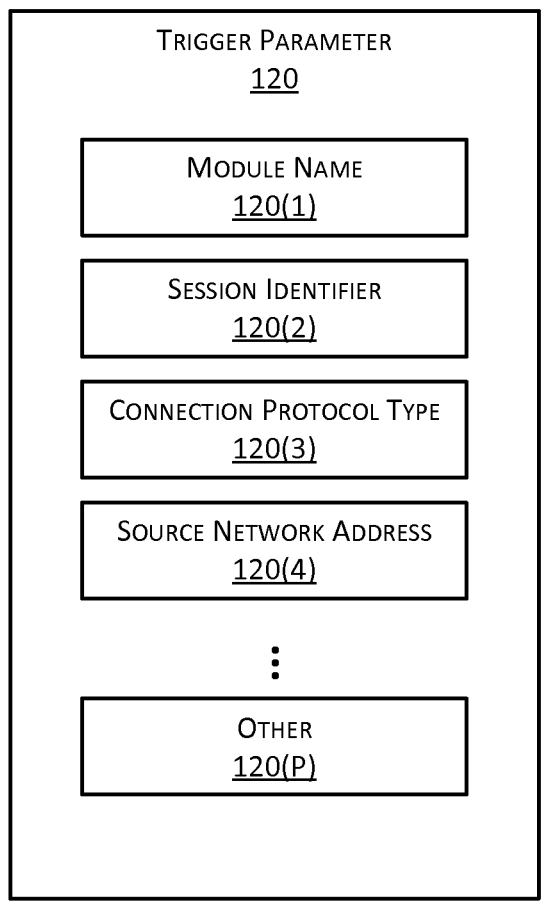
FIG. 2 is a block diagram of the trigger parameters.

FIG. 2 is a block diagram 200 of the trigger parameters 120. The trigger parameters 120 specify one or more conditions for activation of the trigger(s) 128 to occur. An administrator, automatic process, or combination thereof may generate the trigger parameters 120.

The trigger parameters 120 may include a module name 120(1). The module name 120(1) is configured to indicate an executable module or service which has provided, or is requesting, the data 104. The trigger parameters 120 may include a session identifier 120(2). The session identifier 120(2) provides information about a particular interaction between the host 102 and the datastore 116. For example, when the host 102 begins the process of querying the datastore 116 for data 104, a session may be established between the management module 110 and the datastore 116, the host 102 and the management module 110, and so forth.

The trigger parameters 120 may also include a connection protocol type 120(3). The connection protocol type 120(3) may provide information indicative of a protocol used by the host 102 to interact with the data server 108. For example, the connection protocol type 120(3) may indicate transmission control protocol/internet protocol ("TCP/IP"), TCP/IP with secure socket layer ("SSL"), named pipes, sockets direct protocol ("SDP"), and so forth.

A source network address 120(4) may be included in the trigger parameters 120. The source network address 120(4) may comprise the internet protocol address, media access control address, and so forth associated with the connection established by the host 102 to the data server 108 using the network 106.

Other data 120(P) may also be included in the trigger parameters 120, such as a device identifier, device type, and so forth. For example, the device type may indicate a particular type of host 102, such as a server, particular model of tablet computer, and so forth.

As described above, the trigger module 114 may use one or more of the trigger parameters 120 to determine whether to activate one or more triggers 128. The data 104 may be inspected to determine the presence of one or more trigger parameters 120 associated with a trigger 128. For example, metadata 104(2) which indicates a module name 120(1) of "ModuleA" may result in activation of the trigger 128.

Figure 3:
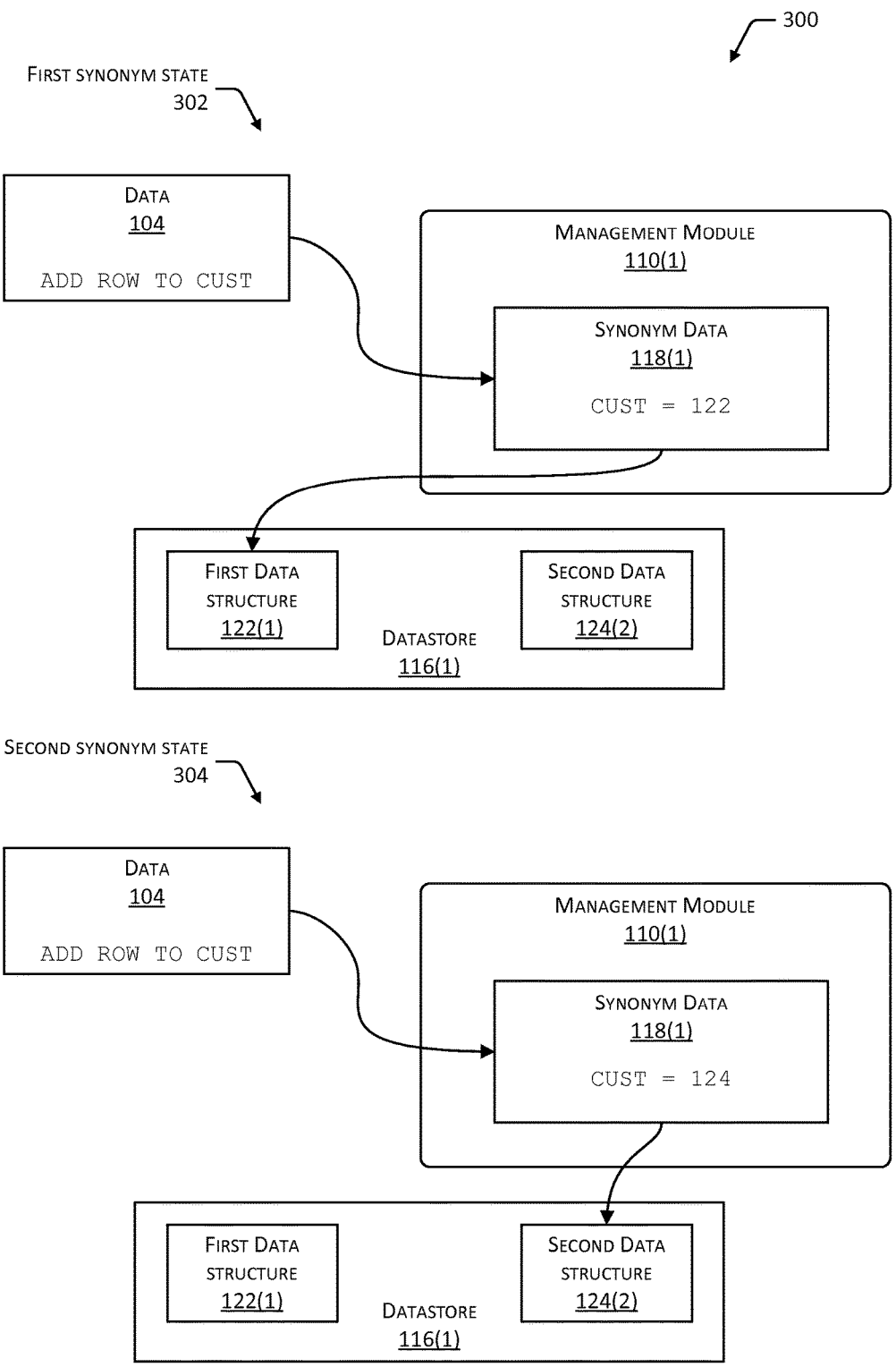
FIG. 3 illustrates the use of synonyms to direct data to a particular data structure for processing.

FIG. 3 illustrates use 300 of synonyms to direct data 104 to a particular data structure for processing. In this illustration, a first synonym state 302 and a second synonym state 304 are shown. In the first synonym state 302, the synonym data 118(1) is configured to provide the synonym of "CUST=122". This synonym data 118(1), when processed by the management module 110, directs the data 104 to the first data structure 122. The management module 110 or another module may add, remove, or modify the synonym data 118. The synonym may be an alternative name for a table, view, query, or other object associated with the datastore 116.

In the second synonym state 304, the synonym data 118(1) has been changed, such as by the management module 110. The synonym data 118(1) now provides the synonym of "CUST=124". This synonym data 118(1), when processed by the management module 110, now directs the data 104 to the second data structure 124.

The synonym data 118 may be changed while the datastore 116 is in operation. In some implementations, changes to the synonym data 118 may result in a brief pause or suspension in transactions to and from the datastore 116. In other implementations, no such pause or suspension may be experienced.

By changing the synonym data 118, the data 104 may be directed to different data structures within the datastore 116. During the migration process, the management module 110 may configure the first synonym data 118(1) of the first datastore 116(1) to direct the data 104 received at that datastore to the first data structure 122(1). Also during the migration process, the second synonym data 118(2) of the second datastore 116(2) may be configured to direct the data 104 received at that datastore to the second data structure 124(2).

Figure 4:
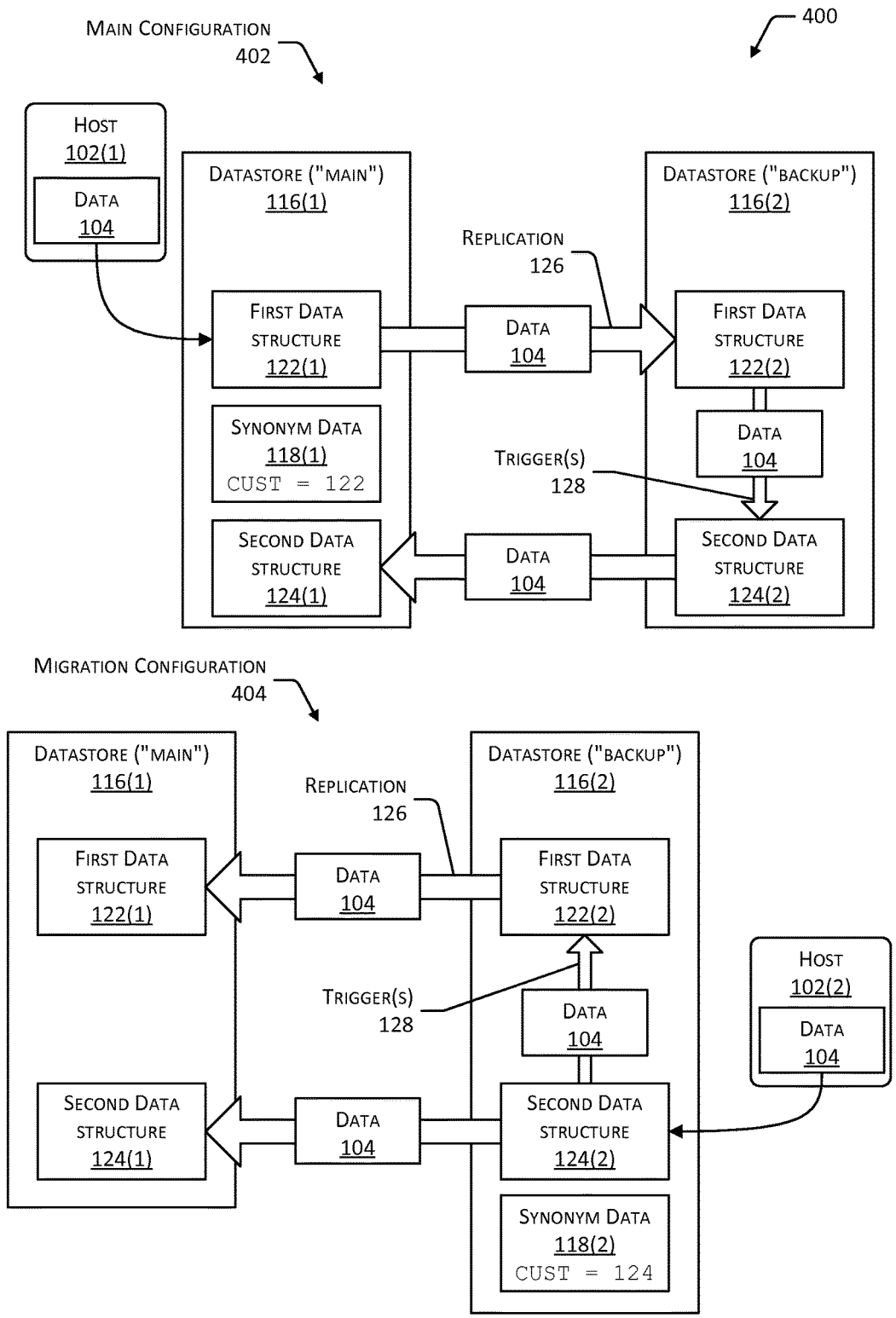
FIG. 4 illustrates a flow of data as received at the main datastore or the backup datastore.

FIG. 4 illustrates a flow 400 of the data 104 as received at the main datastore 116(1) or the backup datastore 116(2), as configured by one or both of the respective management modules 110. In this illustration two states are depicted: main configuration 402 and migration configuration 404.

While in the main configuration 402, the hosts 102 have been configured to direct the data 104 to the first data server 108(1) and the corresponding main datastore 116(1). The synonym data 118(1) provides a synonym which directs the data 104 to the first data structure 122(1). For example, the data 104 may comprise adding a row of data. The synonym in the synonym data 118(1) directs the management module 110(1) to process the transaction using the data 104 with regard to the first data structure 122(1). As a result, the first data structure 122(1) stored in the first datastore 116(1) has the row of data added.

Because replication 126 is established between the first datastore 116(1) and the second datastore 116(2), changes to one datastore are propagated to the other. As a result, the data 104, or the resulting changes to the first data structure 122(1) are made to the first data structure 122(2) in the second datastore 116(2).

The trigger module 114(2) of the data server 108(2) having the second datastore 116(2) processes the data 104 to determine if one or more trigger parameters 120 are present which would result in activation of one or more triggers 128. Continuing the example, the metadata 104(2) includes the module name 120(1) which is specified in the trigger parameters 120, activating the trigger 128. The trigger 128 propagates the information in the row of data to be added to the second data structure 124(2). The propagations may include copying, merging, updating, transforming, and so forth. For example, the propagation may include mapping one or more fields in the first data structure 122(2) to one or more other fields in the second data structure 124(2). Based on the action of the trigger 128, the second data structure 124(2) now includes the data 104, or information based on the data 104. As above, due to the replication 126 between the second datastore 116(2) and the first datastore 116(1), the information in the second data structure 124(2) is provided to the second data structure 124(1) in the first datastore 116(1). The data 104 now is propagated across the different data structures in the different datastores.

While in the migration configuration 404, a first set of one or more hosts 102 provide the data 104 to the second datastore 116(2) of the second data server 108(2). Meanwhile, a second set of other hosts 102 provide the data 104 to the first datastore 116(1) of the first data server 108(1). The first set of hosts 102 may thus be used to test the operation of the second data structure 124(2), the second datastore 116(2), or both, while leaving the second set of hosts 102 unaffected.

As illustrated here, the host 102(2) provides the data 104 to the second datastore 116(2). In one implementation, the hosts 102 may be configured to direct the data 104 to a particular data server 108, datastore 116, or both. In another implementation, the hosts 102 may communicate with a server or use a network address which then routes the data 104 to a particular data server 108.

The data 104 is received by the second data server 108(2). The synonym data 118(2) is configured to direct the data 104 to the second data structure 124(2). Based on the synonym data 118(2), the management module 110(2) processes the data 104 using the second data structure 124(2). As described above, the trigger module 114(2) may activate one or more triggers 128 based on the metadata 104(2) and the trigger parameters 120. The data 104 is then propagated to the first data structure 122(2) in the second datastore 116(2). As described above, due to the replication 126, the data 104 is provided from the second data structure 124(2) and the first data structure 122(2) in the second datastore 116(2) to the corresponding second data structure 124(1) and first data structure 122(1) in the first datastore 116(1).

The main configuration 402 and the migration configuration 404 may exist and operate simultaneously. For example, as described above, a first set of hosts 102(1)-(N) may send the data 104 to the first data server 108(1) while a second set of hosts 102(N+1)-(H) may send the data 104 to the second data server 108(2).

Figure 5:
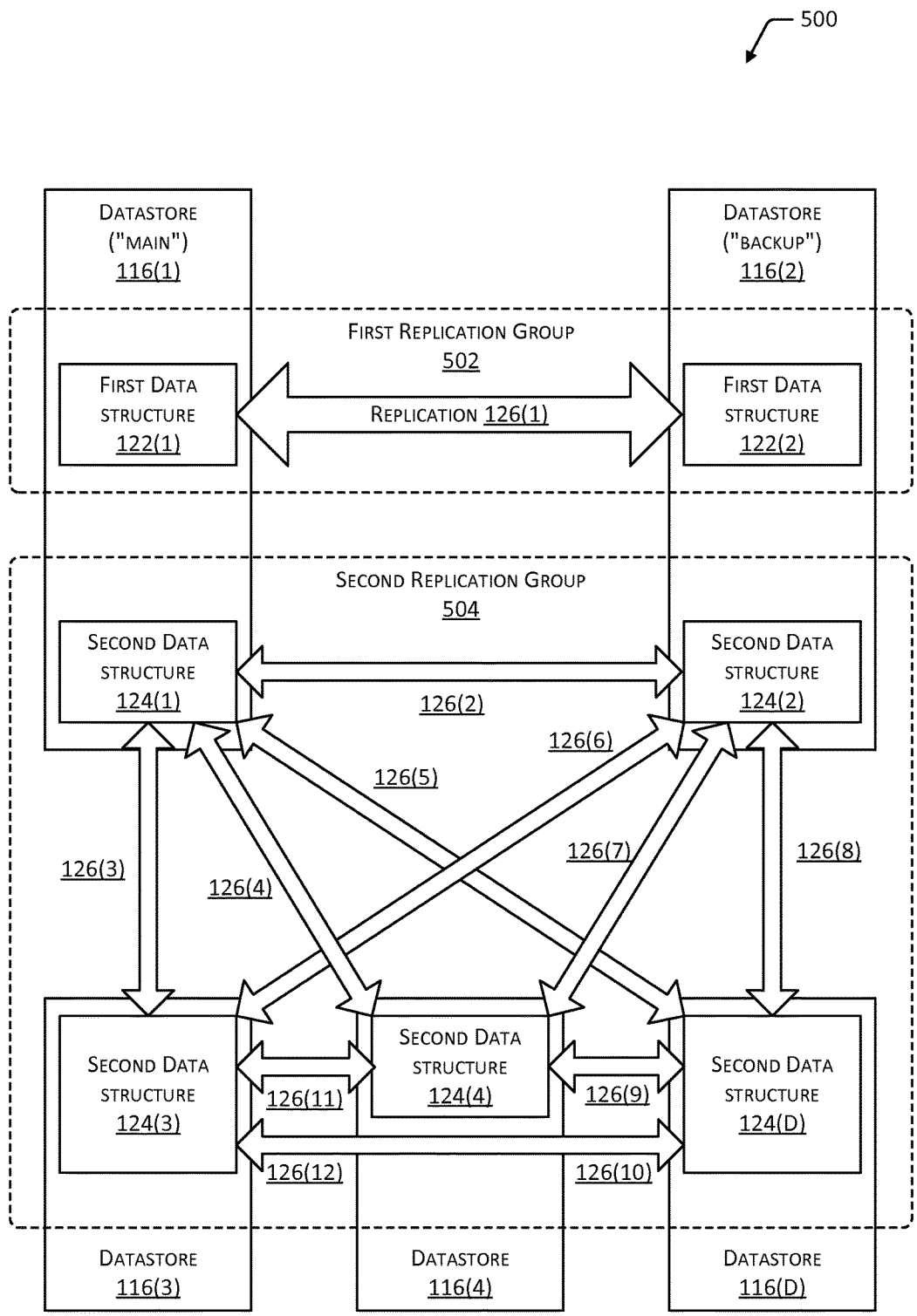
FIG. 5 illustrates the first data structure in a first replication group and the second data structure in a second replication group.

FIG. 5 illustrates replication 500 in the system 100. The replication modules 112 of the data servers 108 may be configured to support replication 126 across one or more datastores 116. The replication modules 112 may be configured to operate at a data storage layer, exchanging information. This information may be at a file system block level, file level, record level, and so forth.

The replication module 112 may support replication 126 across different datastores 116. Two or more datastores 116 across which one or more data structures are replicated 126 may be designated as a replication group. Within a datastore 116, multiple replication groups may exist contemporaneously. For example, as illustrated here a first replication group 502 includes the replication 126(1) between the first data structure 122(1) of the first datastore 116(1) and the first data structure 122(2) of the second datastore 116(2).

In comparison, a second replication group 504 may include replication 126(2)-(12) for the second data structure 124(1) across the datastores 116(2)-(D). For example, the second replication group 504 may include six participating datastores 116 having replication modules 112 configured to perform multi-master replication between the six participating datastores 116.

Because of the replication 126, changes to the data structure in one datastore 116 are also effective at the corresponding replicated data structures in other datastores 116 which participate in the replication group. By using the techniques described herein, data may be migrated from one replication group to another. For example, information which is available in the first replication group 502 may be transferred to the second replication group 504 by migrating data from the first data structure 122 to the second data structure 124. In systems where the management modules 110 typically need to pause or suspend operations associated with changes to replication groups, the techniques described in this disclosure allow for movement of data 104 from one replication group to another without such a pause or suspension.

Figure 6:
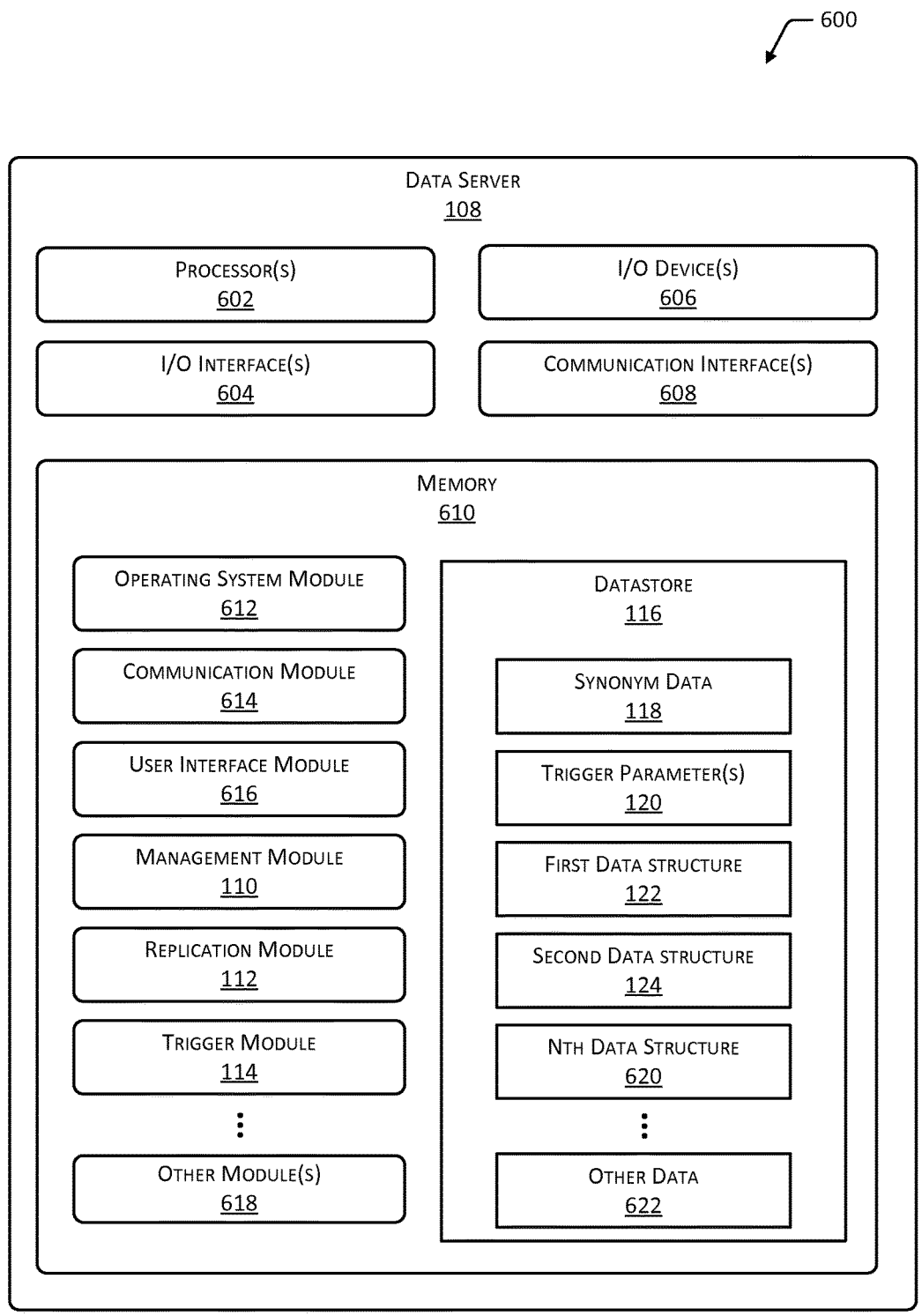
FIG. 6 illustrates a block diagram of the data server configured to use the operations described above.

FIG. 6 illustrates a block diagram 600 of the data server 108 configured to support the modules described above. The data server 108 may execute on a single computing device or across multiple computing devices in one or more physical locations. For example, the data server 108 may execute on a computing device, or as a service across multiple virtual devices executing on computing devices distributed across the globe.

The data server 108 (or "system") may include one or more processors 602 configured to execute one or more stored instructions. The processors 602 may comprise one or more cores. The data server 108 may include one or more input/output ("I/O") interface(s) 604 to allow the processor 602 or other portions of the data server 108 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, and so forth.

The I/O interface(s) 604 may couple to one or more I/O devices 606. The I/O devices 606 may include input devices such as one or more of a keyboard, sensors, 3D scanners, and so forth. The I/O devices 606 may also include output devices such as one or more of a display, printer, and so forth. In some embodiments, the I/O devices 606 may be physically incorporated with the data server 108 or may be externally placed and communicatively coupled thereto.

The data server 108 may also include one or more communication interfaces 608. The communication interfaces 608 are configured to provide communications between the data server 108 and other devices such as network attached storage, the hosts 102, user devices, routers, access points, and so forth. The communication interfaces 608 may include devices configured to couple to one or more networks including local area networks, wide area networks, and so forth.

The data server 108 may also include one or more busses or other internal communications hardware or software that allow for the transfer of data between the various modules and components of the data server 108.

As shown in FIG. 6, the data server 108 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the data server 108.

The memory 610 may include at least one operating system ("OS") module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A communication module 614, is configured to support communication between the data servers 108 using the network 106. For example, the communication module 614 may implement a transmission control protocol/internet protocol ("TCP/IP") stack for communication.

A user interface module 616 may be configured to provide a user interface accessible to the hosts 102, administrative users, and so forth. This user interface may be provided as a graphical user interface such as web page expressed as markup language such as hypertext markup language ("HTML"), an application programming interface ("API"), and so forth.

The memory 610 may also store the management module 110. As described above, the management module 110 is configured to manage the processing operations of the data server 108. For example, the management module 110 may comprise a database management system and corresponding datastore 116 such as the Oracle® RDBMS as provided by Oracle Corp. of Redwood City, Calif., Microsoft SQL® as provided by Microsoft Corp. of Seattle, Wash., DynamoDB® as provided by Amazon Web Services Inc. of Seattle, Wash., and so forth.

The replication module 112 may also be stored in the memory 610 and provides replication 126 services between data servers 108, datastores 116, or both. The replication module 112 may operate on a data storage layer. For example, the replication module 112 may work in conjunction with the OS module 612 to transfer blocks of information between data structures participating in replication 126. For example, the replication module 112 may support the Oracle® multi-master replication ("MMR") for use with the Oracle® RDBMS. In some implementations, the replication module 112 may be a part of the management module 110.

The memory 610 may also store the trigger module 114. The trigger module 114 is configured to activate one or more triggers 128. The triggers 128 may be associated with one or more data structures. For example, the trigger 128(1) may be associated with the first data structure 122 while the trigger 128(2) may be associated with the second data structure 124. Activation of the trigger(s) 128 may be based on a comparison or analysis of at least a portion of the data 104 with the one or more trigger parameters 120.

Other modules 618 may also be present. For example, an authentication module may determine identity of the host 102, while an access control module controls the activities of the host 102 based at least in part on that identity.

The memory 610 may also include the datastore 116 to store information. The datastore 116 may use a flat file, database, linked list, tree, executable code, or other data structure to store the information. In some implementations, the datastore 116 or a portion of the datastore 116 may be distributed across one or more other devices including servers, network attached storage devices, and so forth.

As depicted here, the datastore 116 may store one or more of the synonym data 118, the trigger parameters 120, the first data structure 122, the second data structure 124, or an (N)th data structure 620. Other data 622 may also be stored in the datastore 116. For example, the other data 622 may include administrator permissions, account information, and so forth. A single datastore 116 is depicted in the memory 610 by way of illustration and not necessarily as a limitation. For example, the data server 108 may have more than one datastore 116.

The one or more hosts 102 may comprise one or more of the components described above with regard to the data server 108. For example, the host 102 may include a processor 602, memory 610, and so forth.

Illustrative Process

Figure 7:
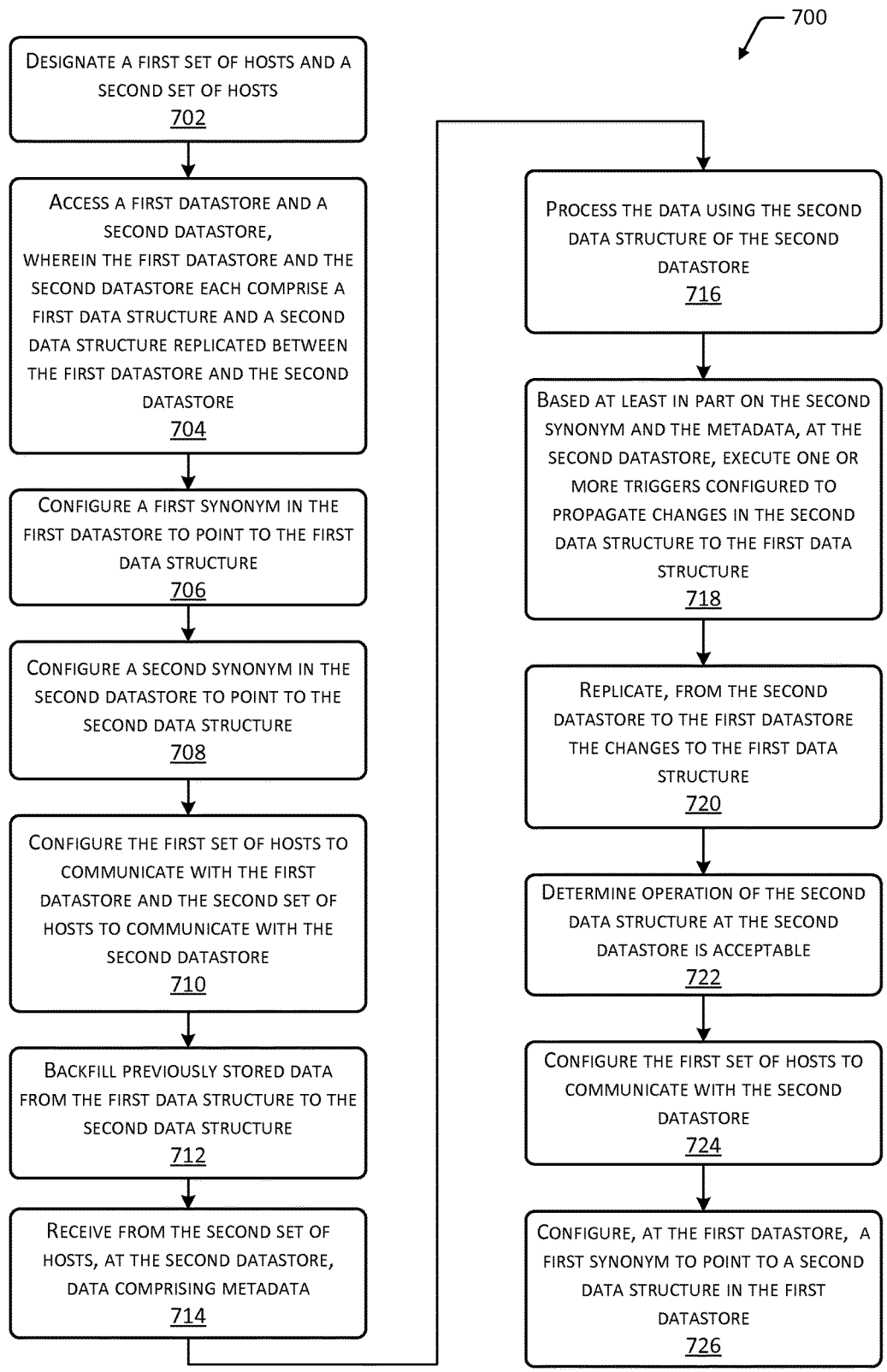
FIG. 7 is a flow diagram of a process of data migration.

FIG. 7 is a flow diagram 700 of a process of data migration using the techniques described above. One or more of the management module 110, the replication module 112, or the trigger module 114 may perform the process.

Block 702 designates a first set of hosts 102 and a second set of hosts 102. For example, the first set of hosts 102 may comprise "regular" or default hosts 102 while the second set of hosts 102 may comprise those hosts 102 slated for use in testing the migration.

Block 704 accesses a first datastore 116(1) and a second datastore 116(2), wherein the first datastore 116(1) and the second datastore 116(2) comprise a first data structure 122 and a second data structure 124 replicated between the first datastore 116(1) and the second datastore 116(2).

Block 706 configures a first synonym in the first datastore 116(1) to point to the first data structure 122(1). For example, the synonym data 118(1) may indicate "CUST=122".

Block 708 configures a second synonym in the second datastore 116(2) to point to the second data structure 124(2). For example, the synonym data 118(2) may indicate "CUST=124".

Block 710 configures the first set of hosts 102 to communicate with the first datastore 116(1) and the second set of hosts 102 to communicate with the second datastore 116(2). In some implementations, the configuration may include sending configuration data to the hosts 102, or communicating with a server or network device to direct data 104 to particular data servers 108 or datastores 116. For example, a network load balancer device between the data servers 108 and the hosts 102 may be configured to direct some of the inbound data 104 to a particular data server 108.

In some implementations, block 712 may backfill previously stored data 104 from the first data structure 122(2) in the second datastore 116(2) to the second data structure 124(2) in the second datastore 116(2). For example, this backfill may be used during the initial stages of a migration to populate a new data structure.

Block 714 receives from the second set of hosts 102, at the second datastore 116(2), data 104. As described above, the data 104 may include payload 104(1) and metadata 104(2).

Block 716 processes the data 104 using the second data structure 124(2) of the second datastore 116(2). For example, the processing of the data 104 may add a record to the second data structure 124(2).

At the second datastore 116(2), based at least in part on the second synonym and the metadata 104(2), block 718 executes one or more triggers 128. As described above, the triggers 128 may be configured to propagate changes in the second data structure 124(2) to the first data structure 122(2). Continuing the example, the trigger 128 may use the data 104 to add a record to the first data structure 122(2).

For example, the metadata 104(2) may comprises a module name for a session with the datastore 116. The trigger module 114(2) may compare the module name to the one or more trigger parameters 120. Based at least in part on the module name of the session corresponding to the one or more trigger parameters 120, the trigger 128 is executed.

To prevent situations where the same data 104 is processed multiple times, in some implementations the metadata 104 may be modified. Continuing the example, the module name of the session may be modified.

Block 720 replicates from the second datastore 116(2) to the first datastore 116(1) the changes to the first data structure 122(2). Continuing the example, the replication 126 may transfer data which adds the record to the first data structure 122(1).

Block 722 determines operation of the second data structure 124(2) at the second datastore 116(2) is acceptable. For example, the administrators of the system 100 may determine that testing indicates no problems and the second data structure 124(2) is performing within specified bounds.

Block 724 configures the first set of hosts 102 to communicate with the second datastore 116(2) or the second data server 108(2). This configuration may be based on the determination that operation of the second data structure 124 is acceptable.

Block 726 configures, at the first datastore 116(1), a first synonym to point to the second data structure 124(1) in the first datastore 116(1). For example, the first synonym data 118(1) may specify "CUST=124". Based on this configuration, subsequent incoming data 104 will be provided to the second data structure 124(1). The datastores 116(1) and 116(2) have effectively swapped their roles, in that the first datastore 116(1) is now acting as the backup while the second datastore 116(2) is now acting as the main.

Figure 8:
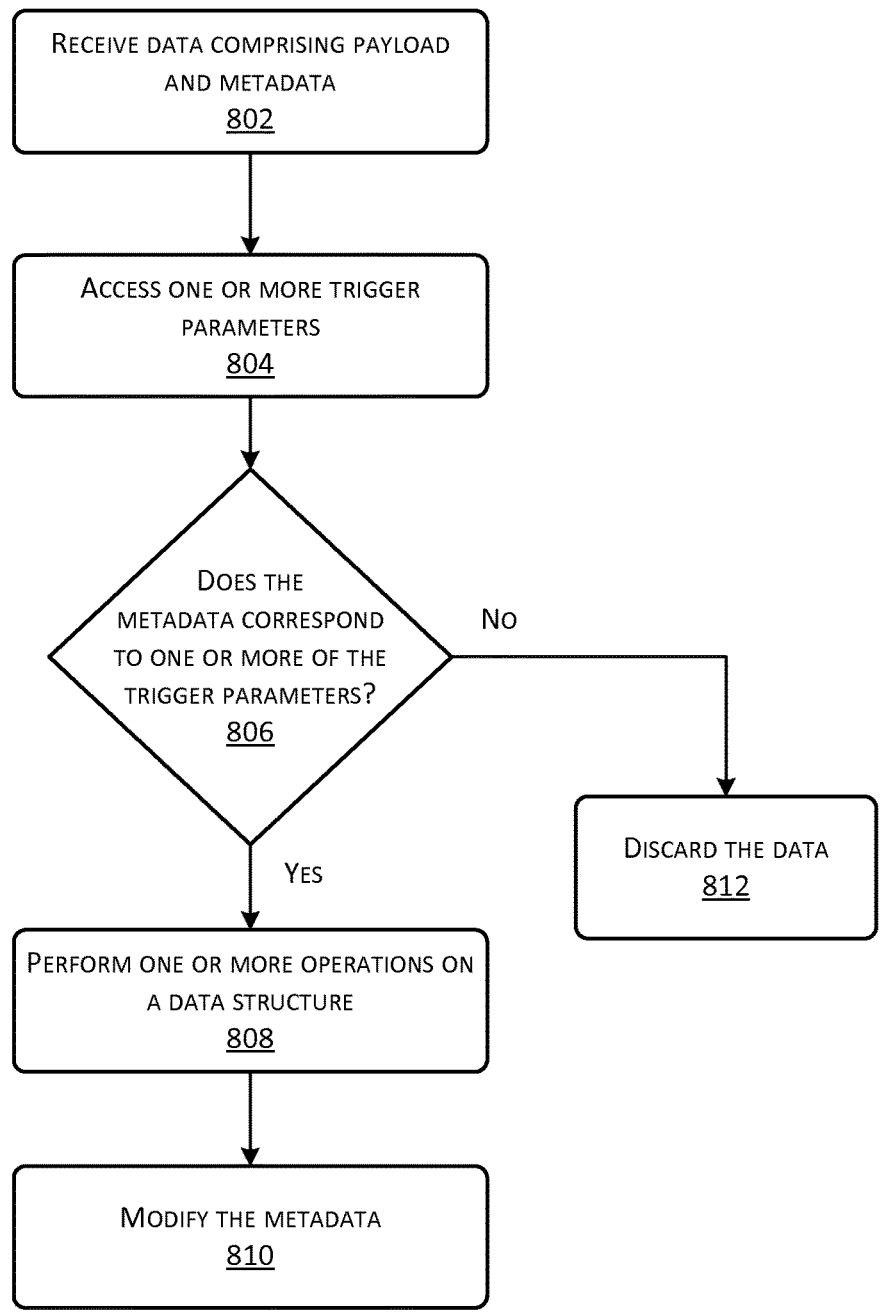
FIG. 8 is a flow diagram of a process of one or more triggers performing one or more operations on a data structure.

FIG. 8 is a flow diagram 800 of a process of one or more triggers 128 performing one or more operations on a data structure. One or more of the management module 110, the replication module 112, or the trigger module 114 may perform the process.

Block 802 receives, at a replicated datastore 116, data 104 comprising payload 104(1) and metadata 104(2). The replicated datastore 116 may comprises a first data structure 122 and a second data structure 124. For example, the datastore 116 may comprise a database having a first table and a second table.

Block 804 accesses one or more trigger parameters 120. The trigger parameters 120 may be provided manually by an administrator using the user interface module 616. In some implementations, one or more of the trigger parameters 120 may be associated with a particular data structure. For example, the trigger parameters 120 may be associated with the second table.

Block 806 determines the metadata 104(2) corresponds to the one or more trigger parameters 120. When the determination is such that a correspondence is present, the process may proceed to block 808.

Block 808, based at least in part on the correspondence of the metadata 104(2) to the one or more trigger parameters 120, performs one or more operations on the second data structure 124. The one or more operations may be configured to propagate the data 104, or information based thereon, to the first data structure 122. For example, the data 104 may be propagated from the second table to the first table.

Block 810 modifies the metadata 104(2). The modification may be used to prevent or inhibit the one or more triggers 128 from executing again with regard to the same piece of data 104. For example, the metadata 104(2) indicating the module name associated with the session for the data 104 may be changed such that the module name no longer corresponds to the trigger parameters 120. In other implementations, other techniques may be used to prevent duplicative processing of the data 104.

Returning to block 806, when the metadata 104(2) fails to correspond to one or more of the trigger parameters 120, the process may proceed to block 812. Block 812 discards the data 104.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
at least one memory storing computer-executable instructions;
at least one processor in communication with the memory to execute the computer-executable instructions to implement one or more services to:
designate a first set of hosts and a second set of hosts;
access a first datastore and a second datastore, wherein individual ones of the first datastore and the second datastore comprise a first data structure and a second data structure replicated between the first datastore and the second datastore, and wherein the first data structure is a data structure of a first type and the second data structure is a data structure of a second type that is different from the first type;
configure a first synonym in the first datastore to point to the first data structure;
configure a second synonym in the second datastore to point to the second data structure;
configure the first set of hosts to communicate with the first datastore and the second set of hosts to communicate with the second datastore;
receive from the second set of hosts, at the second datastore, data comprising metadata;
process the data using the second data structure of the second datastore;
access one or more trigger parameters;
determine the data satisfies at least one of the one or more trigger parameters;
execute one or more triggers based at least in part on the data corresponding to the at least one of the one or more trigger parameters, wherein the one or more triggers propagate changes from the second data structure of the second datastore to the first data structure of the second datastore;
replicate, from the second datastore to the first datastore, the changes to the first data structure; and
configure, at the first datastore, the first synonym to point to the second data structure of the first datastore.

2. The system of claim 1, the one or more services further configured to:
   backfill previously stored data from the first data structure in the second datastore to the second data structure in the second datastore.

3. The system of claim 1, wherein the metadata comprises a module name for a session with the first datastore, and the one or more services are further configured to:
   execute the one or more triggers based on the module name of the session corresponding to the one or more trigger parameters; and
   modify the module name of the session.

4. The system of claim 1, the one or more services further configured to:
   determine operation of the second data structure at the second datastore is acceptable; and
   configure the first set of hosts to communicate with the second datastore.

5. The system of claim 1, wherein the first data structures in the first datastore and the second datastore are within a first replication group, the second data structures in the first datastore and the second datastore are in a second replication group; and
   further wherein the first replication group and the second replication group comprise, at least in part, different computing devices.

6. A computer-implemented method, the computer-implemented method comprising:
   establishing replication between a first datastore and a second datastore, wherein individual ones of the first datastore and the second datastore comprise a first data structure and a second data structure, and wherein the first data structure is a data structure of a first type and the second data structure is a data structure of a second type;
   configuring a first synonym in the first datastore to point to the first data structure;
   configuring a second synonym in the second datastore to point to the second data structure; and
   at the second datastore, executing one or more triggers to propagate changes to data in the first data structure to the second data structure based on the data and one or more trigger parameters, wherein the data corresponds to at least one of the one or more trigger parameters.

7. The computer-implemented method of claim 6, wherein the first synonym and the second synonym comprise an alternative name for a table, view, or another synonym.

8. The computer-implemented method of claim 6, wherein the replication is provided by a storage layer service.

9. The computer-implemented method of claim 6, wherein the first data structures in the first datastore and the second datastore are within a first replication group, and the second data structures in the first datastore and the second datastore are in a second replication group.

10. The computer-implemented method of claim 6, the data comprising metadata and payload; and
   wherein the executing the one or more triggers is based at least in part on the metadata.

11. The computer-implemented method of claim 10, wherein the metadata comprises a module name of a session associated with acquisition of the data.

12. The computer-implemented method of claim 6, wherein the first datastore is designated as a main datastore and the second datastore is designated as backup datastore, such that the first datastore is initially configured for use by a majority of hosts.

13. The computer-implemented method of claim 6, wherein the first data structure comprises a relational database and the second data structure comprises a relational database.

14. The computer-implemented method of claim 6, further comprising:
   designating a first set of hosts and a second set of hosts; and
   configuring the first set of hosts to communicate with the first datastore and the second set of hosts to communicate with the second datastore.

15. The computer-implemented method of claim 14, further comprising:
   determining the operation of the second data structure at the second datastore is acceptable; and
   configuring the first synonym in the first datastore to point to the second data structure.

16. A computer-implemented method, the computer-implemented method comprising:
   receiving, at a replicated database, data comprising payload and metadata, wherein the replicated database comprises a first table and a second table, and wherein the first table is a table of a first type and the second table is a table of a second type that is different from the first type;
   accessing one or more trigger parameters associated with the second table;
   determining the metadata corresponds to the one or more trigger parameters;
   based on the correspondence of the metadata to the one or more trigger parameters, performing one or more operations on the second table, wherein the one or more operations are configured to propagate the data to the first table; and
   modifying the metadata to prevent one or more triggers from executing again with regard to the data.

17. The computer-implemented method of claim 16, wherein the first table in the replicated database and a first table in another database are within a first replication group, the second table in the replicated database and a second table in the another database are in a second replication group; and
   further wherein the first replication group and the second replication group comprise, at least in part, different computing devices.

18. The computer-implemented method of claim 16, further comprising:
   configuring a first synonym in the replicated database to point to the first table;
   configuring a second synonym in another database to point to the second table;
   determining operation of the second table at the another database is acceptable; and
   configuring the first synonym in the replicated database to point to the second table.

19. The computer-implemented method of claim 16, wherein the metadata comprises a module name of a communication session providing the data to the replicated database.

20. The computer-implemented method of claim 16, wherein the second table is based on the first table, and the trigger parameters comprise at least one of:
   a module name of a communication session;
   a session identifier providing information about the communication session;

a connection protocol type providing information of a protocol used;
a source network address associated with the communication session;
a device identifier; or
a device type.

\* \* \* \* \*